(12) United States Patent  
Hou

(10) Patent No.: US 10,583,994 B2  
(45) Date of Patent: *Mar. 10, 2020

(54) CONVEYOR BELT MONITORING SYSTEM

(71) Applicant: The Yokohama Rubber Co., LTD., Minato-ku, Tokyo (JP)

(72) Inventor: Gang Hou, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/215,412

(22) Filed: Dec. 10, 2018

(65) Prior Publication Data

US 2020/0017309 A1 Jan. 16, 2020

Related U.S. Application Data

(63) Continuation of application No. 15/742,494, filed as application No. PCT/JP2016/064285 on May 13, 2016, now Pat. No. 10,294,038.

(30) Foreign Application Priority Data

Aug. 24, 2015 (JP) .................................. 2015-164730

(51) Int. Cl.

| | |
|---|---|
| *B65G 43/00* | (2006.01) |
| *B65G 43/02* | (2006.01) |
| *B65G 15/08* | (2006.01) |
| *B65G 43/08* | (2006.01) |
| *B65G 23/44* | (2006.01) |
| *B65G 39/18* | (2006.01) |
| *B65G 15/64* | (2006.01) |

(52) U.S. Cl.  
CPC .............. *B65G 43/02* (2013.01); *B65G 15/08* (2013.01); *B65G 15/64* (2013.01); *B65G 23/44* (2013.01); *B65G 2203/0275* (2013.01); *B65G 2203/042* (2013.01)

(58) Field of Classification Search  
None  
See application file for complete search history.

(56) References Cited

U.S. PATENT DOCUMENTS

| | | | |
|---|---|---|---|
| 4,372,172 A * | 2/1983 | Gombocz .............. | G01B 7/042 198/810.04 |
| 7,634,949 B2 * | 12/2009 | Lodge ..................... | G01L 5/047 73/828 |
| 7,748,521 B2 | 7/2010 | Aizawa et al. | |

(Continued)

FOREIGN PATENT DOCUMENTS

| | | |
|---|---|---|
| WO | WO 2006/112318 | 10/2006 |
| WO | WO 2013/110312 | 8/2013 |

*Primary Examiner* — Kavel Singh  
(74) *Attorney, Agent, or Firm* — Thorpe North & Western

(57) ABSTRACT

Provided is a conveyor belt monitoring system that determines whether or not an abnormality has occurred in the conveyor belt. The system successively detects elongation of a running conveyor belt using an elongation detection mechanism, and further successively detects tension acting on a core layer forming the conveyor belt on the basis of power consumption of the running conveyor belt. On the basis of data obtained, the system monitors the presence/absence of the abnormality in the conveyor belt using a control unit.

2 Claims, 5 Drawing Sheets

(56) References Cited

U.S. PATENT DOCUMENTS

| | | | |
|---|---|---|---|
| 7,894,934 B2 * | 2/2011 | Wallace | ................. B65G 43/00 |
| | | | 700/230 |
| 9,227,793 B2 * | 1/2016 | Rathmann | .............. B65G 43/02 |
| 2009/0145730 A1 | 6/2009 | Aizawa et al. | |
| 2014/0336812 A1 | 11/2014 | Rathmann et al. | |

* cited by examiner

CONVEYOR BELT MONITORING SYSTEM

RELATED APPLICATIONS

This application is a continuation of U.S. patent application Ser. No. 15/742,494, filed on Jan. 5, 2018, which is the National Stage of International Patent Application No. PCT/JP2016/064285, filed on May 13, 2016, which claims the benefit of priority from Japan Patent Application No. 2015-164730, filed on Aug. 24, 2015, the entire contents of each of which are incorporated herein by reference.

TECHNICAL FIELD

The present technology relates to a conveyor belt monitoring system, and more particularly relates to a conveyor belt monitoring system capable of accurately detecting signs of the occurrence of failure, such as rupture, in a conveyor belt.

BACKGROUND ART

Various objects, including mineral resources such as iron ore and limestone, are conveyed by a conveyor belt. Those objects to be conveyed are fed onto the surface of an upper cover rubber of the conveyor belt from a hopper or from another conveyor belt. Here, for example, if the upper cover rubber is damaged by the object to be conveyed and a core layer, which bears the tension of the conveyor belt, is damaged as a result, the core layer becomes unable to sufficiently bear the tension. If the core layer is ruptured, the conveyor belt cannot be operated, and there is no choice but to discontinue the conveying operation. A significant amount of time and expense are required to repair or replace the ruptured conveyor belt and restore the operation. Thus, various technologies for detecting such failure of the conveyor belt at an early stage have been proposed (see Japanese Unexamined Patent Application Publication No. 2010-52927, for example).

However, the conventional methods proposed adopt a system in which elongation of the conveyor belt is monitored, and an abnormality is detected on the basis of the acquired elongation data. However, even when the elongation is significantly large, some conveyor belts (core layers) do not rupture easily. Further, the elongation of the conveyor belt is obtained as a total of an elongation of the core layer and a shift amount of an endless part (a connecting part) of the core layer. Thus, even when conveyor belts share identical specifications, variations occur in the elongation of the conveyor belt depending on a combination of the elongation and the shift amount. Therefore, in some cases, whether or not the conveyor belt is likely to rupture soon cannot be determined simply on the basis of the elongation of the conveyor belt. There has thus been room for improvement in relation to accurately detecting the signs of rupture and the like of the conveyor belt simply by monitoring the elongation of the conveyor belt.

SUMMARY

The present technology provides a conveyor belt monitoring system capable of accurately detecting signs of the occurrence of failure, such as rupture, in a conveyor belt.

A conveyor belt monitoring system of the present technology includes: an elongation detection mechanism configured to successively detect elongation of a conveyor belt while the conveyor belt is running; a tension detection mechanism configured to successively detect tension acting on a core layer forming the conveyor belt; and a control unit into which data obtained from the elongation detection mechanism and the tension detection mechanism are input, the control unit being further configured to monitor a presence and absence of an abnormality of the conveyor belt on the basis of the input data.

According to the present technology, since the tension acting on the core layer is detected as well as the elongation of the running conveyor belt, signs of an occurrence of failure, such as rupture, in the conveyor belt can be accurately detected compared with a case in which only the data of the elongation of the conveyor belt are used.

Here, for example, the elongation detection mechanism detects the elongation in a plurality of positions arranged at predetermined intervals in a width direction of the conveyor belt. As a result, an abnormal elongation that is unevenly distributed in the width direction of the conveyor belt can be detected. In this way, signs of the rupture or the like of the conveyor belt can be even more accurately detected.

The elongation detection mechanism can also detect the elongation in a plurality of positions arranged at predetermined interval in a longitudinal direction of the conveyor belt. As a result, an abnormal elongation that is unevenly distributed in the longitudinal direction of the conveyor belt can be detected. In this way, signs of the rupture or the like of the conveyor belt can be even more accurately detected.

Elongation of an endless part and of a non-endless part of the core layer is detected as the elongation of the conveyor belt, for example. As a result, a shift amount of the endless part and the elongation of the non-endless part are more easily distinguished and ascertained. This is advantageous in terms of accurately detecting signs of the rupture or the like of the conveyor belt.

The tension detection mechanism can also successively detect the tension acting on the core layer on the basis of power consumption of the running conveyor belt. With this configuration, the tension can be detected in a relatively simple manner.

DETAILED DESCRIPTION

Figure 1:
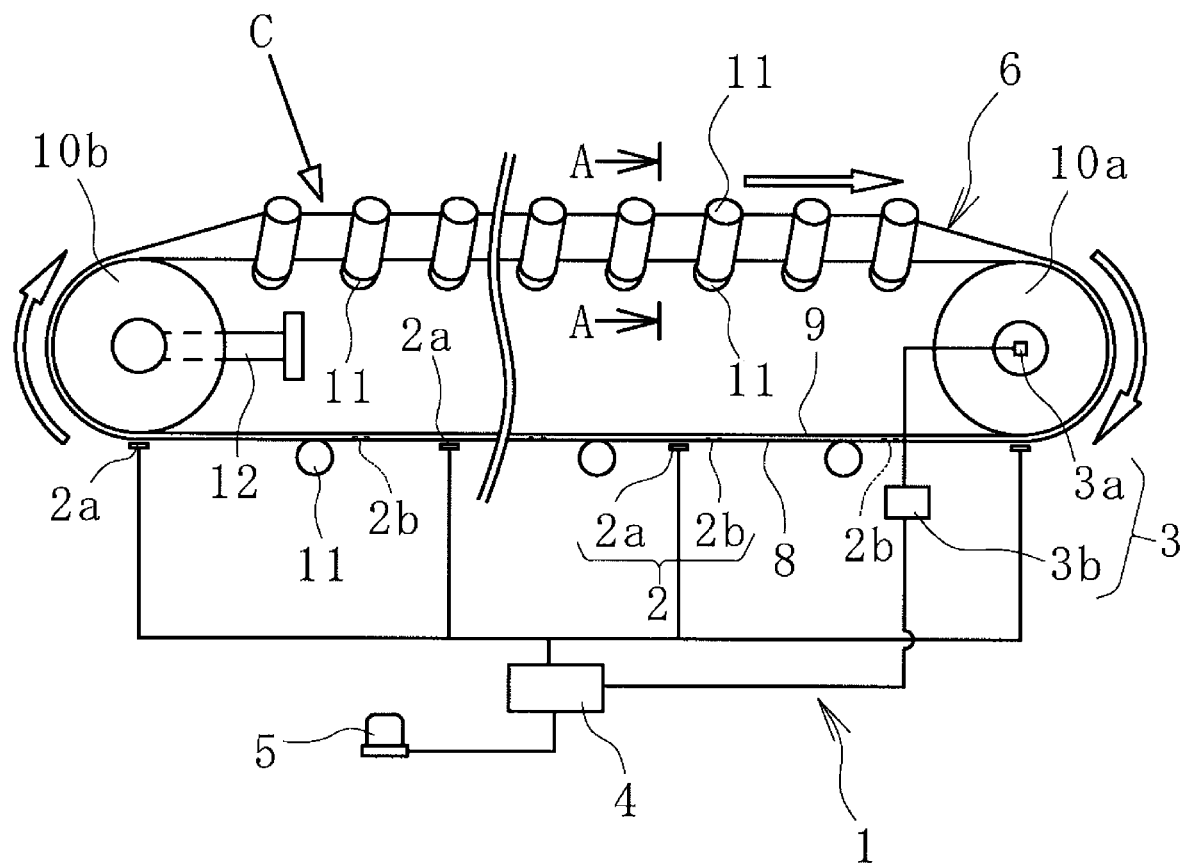
FIG. 1 is an explanatory diagram illustrating a conveyor belt monitoring system of the present technology in a side view.

A conveyor belt monitoring system of the present technology will be described below on the basis of an embodiment illustrated in the drawings.

Figure 2:
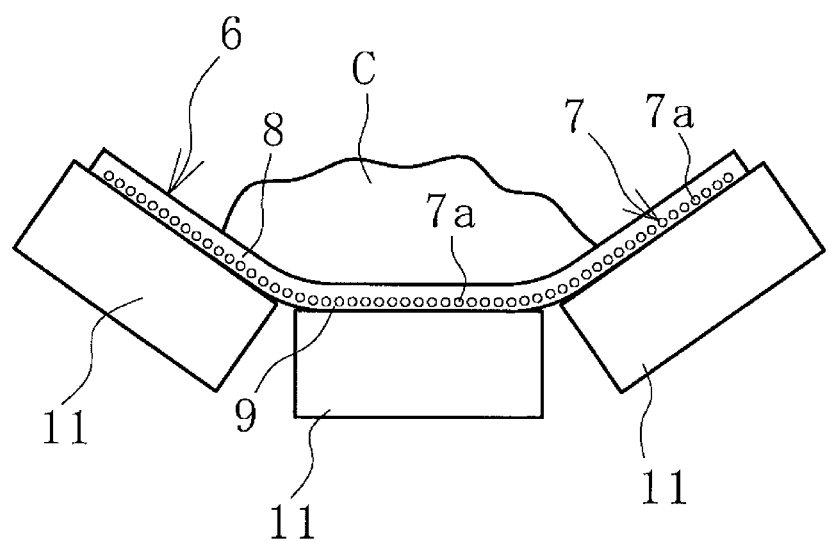
FIG. 2 is a cross-sectional view taken along A-A in FIG. 1.

A conveyor belt monitoring system 1 (hereinafter referred to as a system 1) of the present technology illustrated in FIG. 1 is applied to a conveyor belt 6 of an actual conveyor belt line. As illustrated in FIG. 2, the conveyor belt 6 to be monitored is configured by a core layer 7 made of canvas or steel cords, and an upper cover rubber 8 and a lower cover rubber 9 that sandwich the core layer 7 therebetween. The core layer 7 is a member that bears a tension that causes the conveyor belt 6 to be stretched. The conveyor belt 6 is further configured by adding other necessary members as appropriate.

The conveyor belt 6 is mounted between a driving pulley 10a and a driven pulley 10b and stretched therebetween at a predetermined tension. Between the driving pulley 10a and the driven pulley 10b, the conveyor belt 6 is supported by support rollers 11 arranged at appropriate intervals in the belt longitudinal direction.

The lower cover rubber 9 is supported by the support rollers 11 on a carrier side of the conveyor belt 6, and the upper cover rubber 8 is supported by the support rollers 11 on a return side. Three of the support rollers 11 are arranged on the carrier side of the conveyor belt 6 in the belt width direction, and the conveyor belt 6 is supported in a recessed shape having a predetermined trough angle by these support rollers 11.

The driving pulley 10a is driven to rotate by a drive motor. A take-up mechanism 12 causes the driven pulley 10b to move and causes the tension to act on the conveyor belt 6 (core layer 7) by changing the distance between the driving pulley 10a and the driven pulley 10b.

Figure 3:
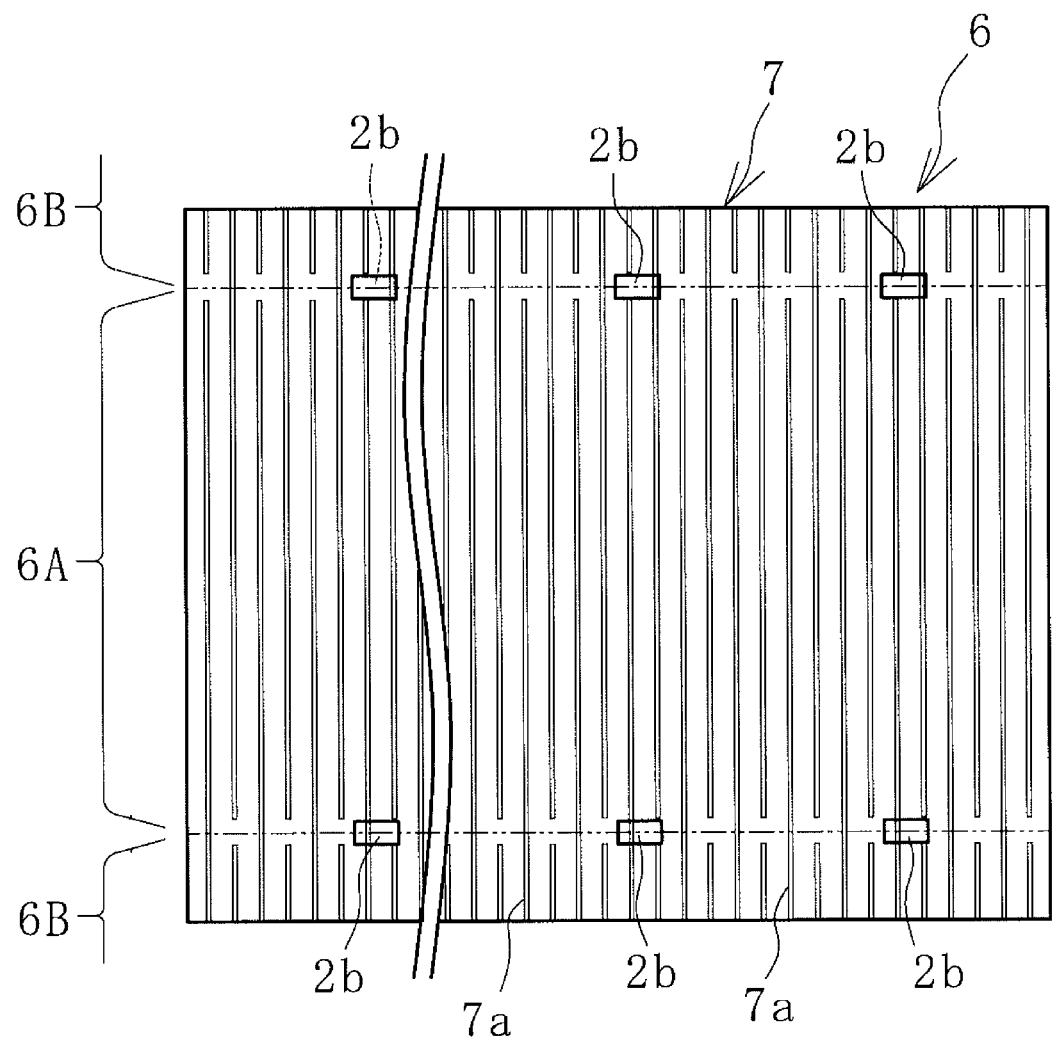
FIG. 3 is an explanatory diagram illustrating an arrangement of chips of an elongation detection mechanism in an endless part, while illustrating the interior of a conveyor belt in a plan view.
Figure 4:
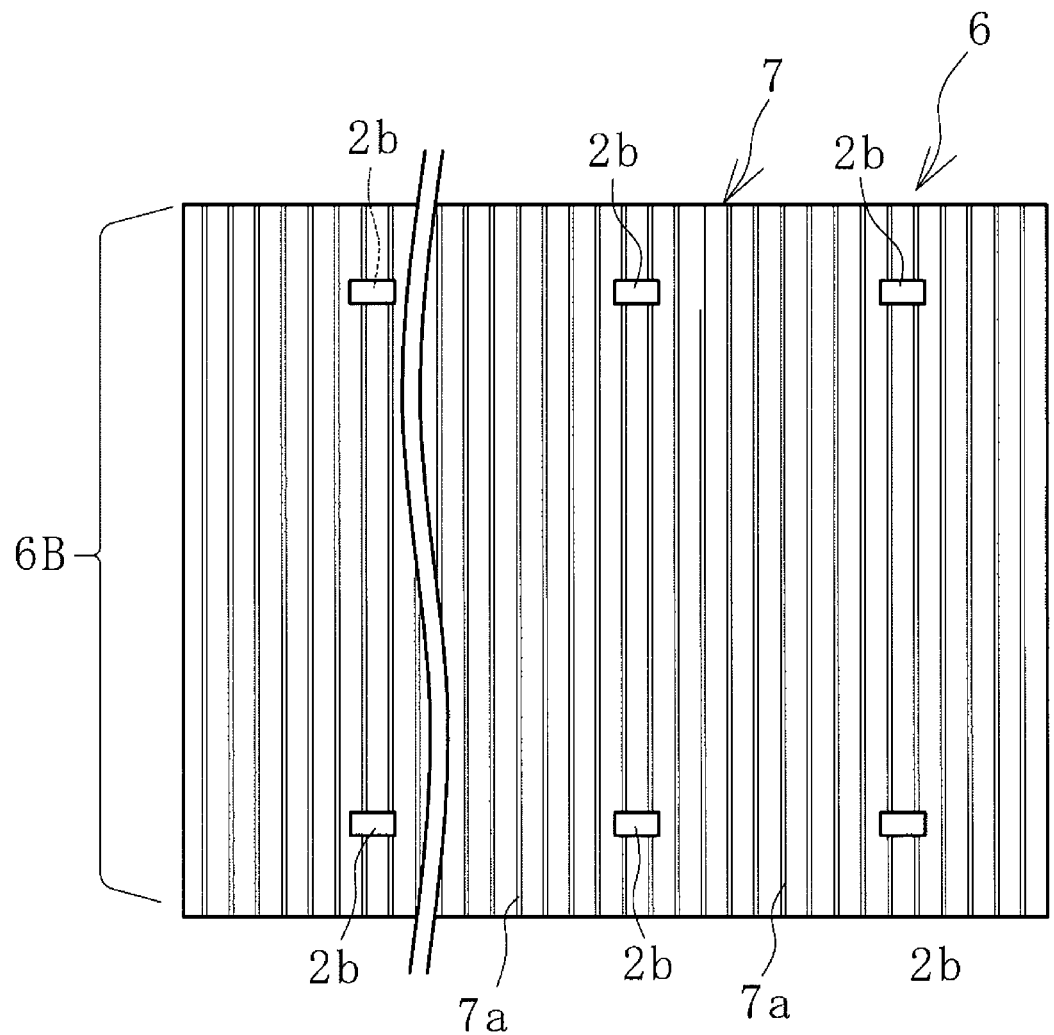
FIG. 4 is an explanatory diagram illustrating an arrangement of the chips of the elongation detection mechanism in a non-endless part, while illustrating the interior of the conveyor belt in a plan view.

End portions of the core layer 7 in the longitudinal direction are joined such that the conveyor belt 6 has an appropriate length. Therefore, in the conveyor belt 6, a portion illustrated in FIG. 3 in which the core layer 7 is joined in the longitudinal direction (an endless part 6A), and a non-endless part 6B illustrated in FIG. 4 are present adjacent to each other. In this conveyor belt 6, the core layer 7 is formed by a plurality of steel cords 7a that are arranged side by side in the belt width direction. In the endless part 6A, the steel cords 7a extending from the non-endless parts 6B that face each other in the belt longitudinal direction are alternately inserted between the adjacent steel cords 7a in the width direction.

When the core layer 7 is formed of canvas, a known structure is adopted in the endless part 6A, in which the canvas extending from the non-endless parts 6B, which face each other in the belt longitudinal direction, is joined so as to form a stepped shape, for example. In the non-endless parts 6B, the core layer 7 is continuously formed without any joint, but the endless part 6A forms a joint of the core layer 7. Thus, differences arise between the endless part 6A and the non-endless parts 6B, in terms of the elongation of the conveyor belt 6 (core layer 7) and the tension acting on the core layer 7.

This system 1 is provided with an elongation detection mechanism 2 that detects the elongation of the conveyor belt 6, a tension detection mechanism 3 that detects the tension acting on the core layer 7, and a control unit 4 into which data obtained by the elongation detection mechanism 2 and the tension detection mechanism 3 are successively input. Data relating to a tolerance range for the elongation of the conveyor belt 6 and a tolerance range for the tension that can be borne by the core layer 7 are input into the control unit 4 in advance. Warning means 5, the operation of which is controlled by the control unit 4, is further provided in this embodiment. Examples of the warning means 5 include a warning lamp, a warning device, and the like.

The elongation detection mechanism 2 is provided with sensor units 2a that are disposed in proximity to the conveyor belt 6 and chips 2b that are installed in the conveyor belt 6. The chips 2b are embedded in the endless part 6A and the non-endless part 6B of the conveyor belt 6, for example. The sensor units 2a are arranged so as to face positions passed by the chips 2b when the conveyor belt 6 is running. In this embodiment, the sensor units 2a are disposed in proximity to the surface of the upper cover rubber 8 on the return side of the conveyor belt 6.

Further, in this embodiment, the chips 2b are installed in the endless part 6A and the non-endless part 6B in a plurality of positions at intervals in the belt width direction, and in a plurality of positions at intervals in the belt longitudinal direction. The sensor units 2a are provided in a plurality of positions at intervals in the belt width direction, and in a plurality of positions at intervals in the belt longitudinal direction. Detection data from the sensor units 2a are input into the control unit 4. The sensor units 2a and the control unit 4 are connected with each other via a wired or wireless connection.

Note that the arrangement position of each of the chips 2b in the conveyor belt 6 is input into the control unit 4 in advance. Further, the running speed of the conveyor belt 6 is successively input into the control unit 4.

The tension detection mechanism 3 includes a sensor unit 3a that detects a power consumption of the drive motor that drives the driving pulley 10a to rotate, and a calculation unit 3b that calculates the tension acting on the core layer 7 on the basis of the detected power consumption. A relationship between the power consumption of the drive motor, which is calculated on the basis of empirical data and the like, and the tension acting on the core layer 7 is input into the calculation unit 3b in advance. Thus, when the power consumption of the drive motor is input into the calculation unit 3b, the tension acting on the core layer 7 at that time can be successively calculated. The calculation data from the calculation unit 3b are input into the control unit 4. The calculation unit 3b and the control unit 4 are connected with each other via a wired or wireless connection.

Next, a method of monitoring the presence and absence of an abnormality of the conveyor belt 6 using the system 1 will be described.

In an actual conveyor belt line, an object to be conveyed is fed onto the surface of the upper cover rubber 8 by a hopper and the like, while the conveyor belt 6 is running. While the conveyor belt 6 is running, the sensor units 2a respectively detect the chips 2b passing by. The running speed of the conveyor belt 6 and the arrangement positions of the chips 2b in the conveyor belt 6 are already known. Thus, on the basis of the detection data of the sensor units 2a, the elongation of the conveyor belt 6 (core layer 7) can be successively detected at a time at which a section between the chips 2b that are adjacent to each other in the longitudinal direction passes the sensor unit 2a that makes the detection.

Further, the sensor unit 3a of the tension detection mechanism 3 successively detects the power consumption required to rotate the driving pulley 10a, and the calculation unit 3b successively calculates the tension acting on the core layer 7. According to this type of configuration in which the tension acting on the core layer 7 is successively detected on the basis of the power consumption required for the running of the conveyor belt 6, the tension can be detected in a relatively simple manner.

The tension acting on the core layer 7 can also be detected by another method. For example, a take-up mechanism 12 can be configured, and the tension can be detected on the basis of an axial force (a force acting in the lateral direction in FIG. 1) that acts on a shaft that causes the driven pulley 10b to move in the belt longitudinal direction (in the lateral direction in FIG. 1). This tension can be detected by one method or a plurality of different methods.

Figure 5:
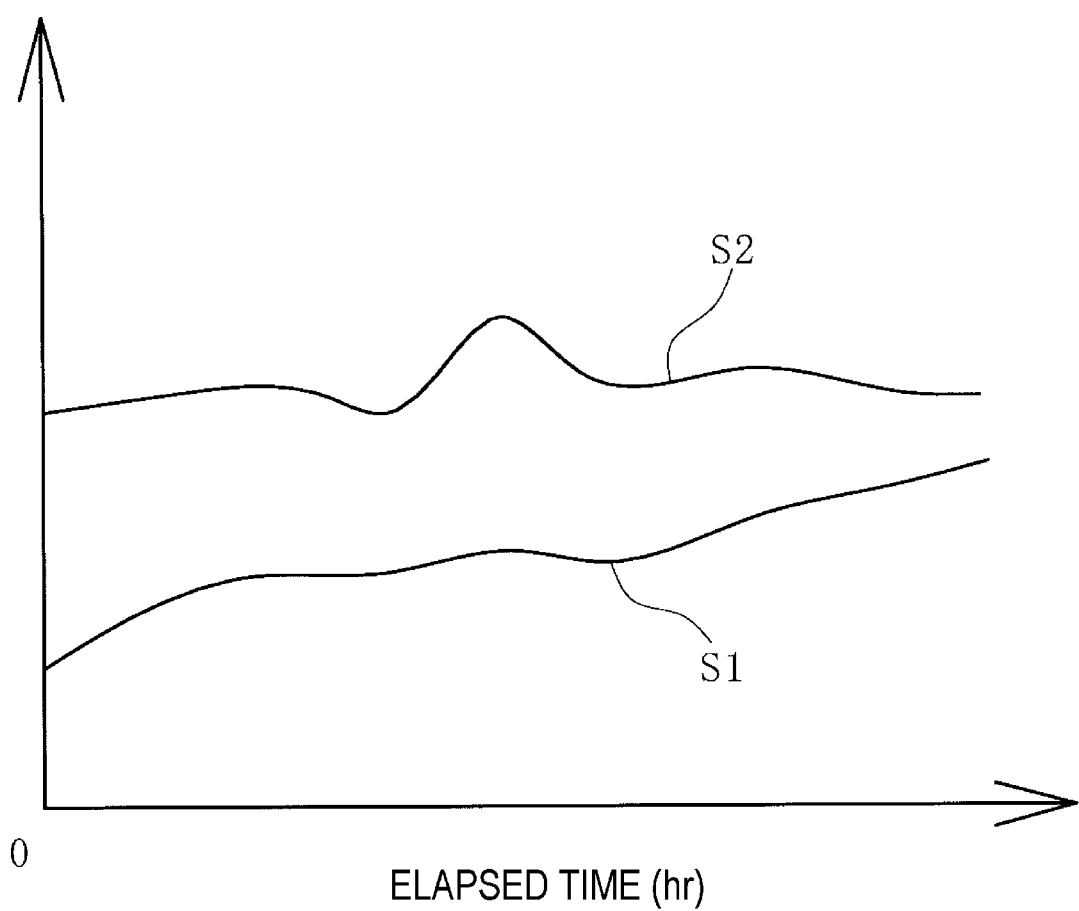
FIG. 5 is a graph showing time-dependent changes in detected elongation of the conveyor belt and tension acting on a core layer.

As described above, by using the elongation detection mechanism 2 and the tension detection mechanism 3, time-dependent data S1 of the elongation of the conveyor belt 6 and time-dependent data S2 of the tension acting on the core layer 7 can be obtained, as illustrated in FIG. 5. On the basis of these data S1 and S2, the control unit 4 detects whether or not there is any sign of an occurrence of a failure, such as rupture, in the conveyor belt 6. Specifically, when both the data S1 and S2 are within the respective tolerance ranges set in advance, the control unit 4 determines that there is no sign of failure. On the other hand, when at least one of the data S1 and S2 are outside the tolerance ranges set in advance, the control unit 4 determines that there is a sign of failure. When it is determined that there is a sign of failure, the warning means 5 is caused to operate in order to inform an operator, a supervisor and the like of the fact that there is a risk of failure occurring.

As well as a configuration in which both the data S1 and S2 are compared with the respective tolerance ranges, another configuration can be adopted in which it is determined that there is a sign of failure when a significant change occurs, within a short period of time, in one of the data S1 and S2, without making a comparison with the tolerance range.

In this way, in the present technology, the obtained elongation data S1 and tension data S2 are utilized by successively detecting the tension acting on the core layer 7 as well as the elongation of the conveyor belt 6 that is running. Therefore, compared with a conventional technology that uses only the elongation data S1, this configuration is advantageous in terms of accurately detecting signs of the occurrence of failure, such as rupture, in the conveyor belt 6. At that time, since a section in which the elongation is larger than that of other sections can also be identified, a section in which a failure is likely to occur can also be ascertained. As a result, a failure can be promptly inspected or repaired, for example.

If the conveyor belt 6 is ruptured in a state in which a large amount of an object to be conveyed C is loaded on the conveyor belt 6, a large number of human-hours are required to deal with the object to be conveyed C that has fallen, and to repair or replace the conveyor belt 6. However, if the section in which a failure is likely to occur can be ascertained in advance using the present technology, the conveyor belt 6 can be repaired or replaced after taking a measure such as reducing the amount of the object to be conveyed C on the conveyor belt 6, for example. Thus, a person skilled in the art can minimize damage without sustaining significant losses.

In this embodiment, the elongation detection mechanism 2 detects the elongation at the plurality of positions arranged in the width direction of the conveyor belt 6 at predetermined intervals. Thus, any abnormal elongation that is unevenly distributed in the width direction of the conveyor belt 6 can be detected. As a result, signs of the rupture or the like of the conveyor belt 6 can be even more accurately detected. It is preferable that the chips 2b be arranged over the entire width in the width direction of the conveyor belt 6 at a predetermined pitch. For example, three or more of the chips 2b are arranged in the width direction of the conveyor belt 6 at equal intervals.

As illustrated in FIG. 2, since the conveyor belt 6 runs while bending in a trough-like shape, the elongation of the conveyor belt 6 and the tension acting on the core layer 7 significantly vary depending on the position in the belt width direction. Further, the occurrence of the rupture or the like of the conveyor belt 6 (core layer 7) originates from the weakest section. Thus, arranging the chips 2b at a central portion (a flat portion in FIG. 2) and at end portions (inclined portions in FIG. 2) of the conveyor belt 6 in the width direction and detecting the elongation, as in this embodiment, is extremely effective in terms of accurately detecting the signs of rupture or the like in the conveyor belt 6.

Further, in this embodiment, the elongation detection mechanism 2 detects the elongation at the plurality of positions that are arranged in the longitudinal direction of the conveyor belt 6 at the predetermined intervals. Thus, an abnormal elongation that is unevenly distributed in the longitudinal direction of the conveyor belt 6 can be detected. As a result, the signs of rupture or the like of the conveyor belt 6 can be even more accurately detected. It is preferable that the chips 2b be arranged over the entire length in the longitudinal direction of the conveyor belt 6 at the predetermined pitch, and that the elongation be detected at the sections of equal length over the entire length.

In this embodiment, the elongation of the endless part 6A and the non-endless part 6B of the conveyor belt 6 (core layer 7) are detected. Thus, the longitudinal-direction shift amount of the steel cords 7a in the endless part 6A and the elongation of the non-endless part 6B can be more easily distinguished and ascertained. For example, when the elongation of the endless part 6A has significantly increased even though the elongation of the non-endless part 6B has not increased, it can be determined that there is a possibility that a significant longitudinal-direction displacement of the steel cords 7a in the endless part 6A, namely so-called "pulling out" from the endless part 6A, has occurred. This is advantageous in terms of accurately detecting the signs of rupture or the like in the conveyor belt 6.

The invention claimed is:

1. A conveyor belt monitoring system, comprising:
   an elongation detection mechanism configured to successively detect elongation of a conveyor belt while the conveyor belt is running;
   a sensor configured to successively detect power consumption of the running conveyor belt;
   a tension detection mechanism configured to successively calculate tension acting on a core layer forming the conveyor belt on a basis of a relationship between the power consumption and the tension; and
   a control unit into which data obtained from the elongation detection mechanism and the tension detection mechanism are input,
   the control unit being further configured to monitor a presence and absence of an abnormality of the conveyor belt on the basis of the input data.

2. A conveyor belt monitoring method, comprising:
   successively detecting elongation of a conveyor belt while the conveyor belt is running using an elongation detection mechanism;
   successively detecting tension acting on a core layer forming the conveyor belt on a basis of power consumption of the running conveyor belt using a tension detection mechanism;
   inputting data obtained from the elongation detection mechanism and the tension detection mechanism to a control unit; and monitoring a presence and absence of an abnormality of the conveyor belt on the basis of the data using the control unit.

* * * * *